United States Patent [19]

Lewis et al.

[11] 4,175,016
[45] Nov. 20, 1979

[54] RADIOLYTIC-CHEMICAL METHOD FOR PRODUCTION OF GASES

[75] Inventors: John G. Lewis; Alfred J. Martin; William W. Meinke, all of Ann Arbor; Charles W. Ricker, Albion; Robert J. Teitel, Ann Arbor, all of Mich.

[73] Assignee: Texas Gas Transmission Corporation, Owensboro, Ky.

[21] Appl. No.: 672,016

[22] Filed: Mar. 30, 1976

Related U.S. Application Data

[63] Continuation-in-part of Ser. No. 609,832, Sep. 2, 1975, abandoned.

[51] Int. Cl.$^2$ ............................................. B01J 1/10
[52] U.S. Cl. ............................................. 204/157.1 H
[58] Field of Search ..................... 204/157.1 R; 55/68; 423/430, 219

[56] References Cited

U.S. PATENT DOCUMENTS

| | | |
|---|---|---|
| 3,098,712 | 7/1963 | Andersen et al. ..................... 423/219 |
| 3,120,479 | 2/1964 | Dols et al. ..................... 204/157.1 R |

OTHER PUBLICATIONS

Steinberg, Advances in Science and Technology, vol. 1 (1962) pp. 309, 312 & 313.

Primary Examiner—Howard S. Williams
Attorney, Agent, or Firm—Laurence R. Brown

[57] ABSTRACT

The invention disclosed provides a new improved radiolytic-chemical method for gas production by inclusion of oxide of nitrogen in the processing system to inhibit recombination of radiolytic products and to scavenge oxygen from the process stream. The present multi-step chemical and radiation method provides gases which may be used directly as fuel or as a base in production of hydrocarbon fuels.

1 Claim, 1 Drawing Figure

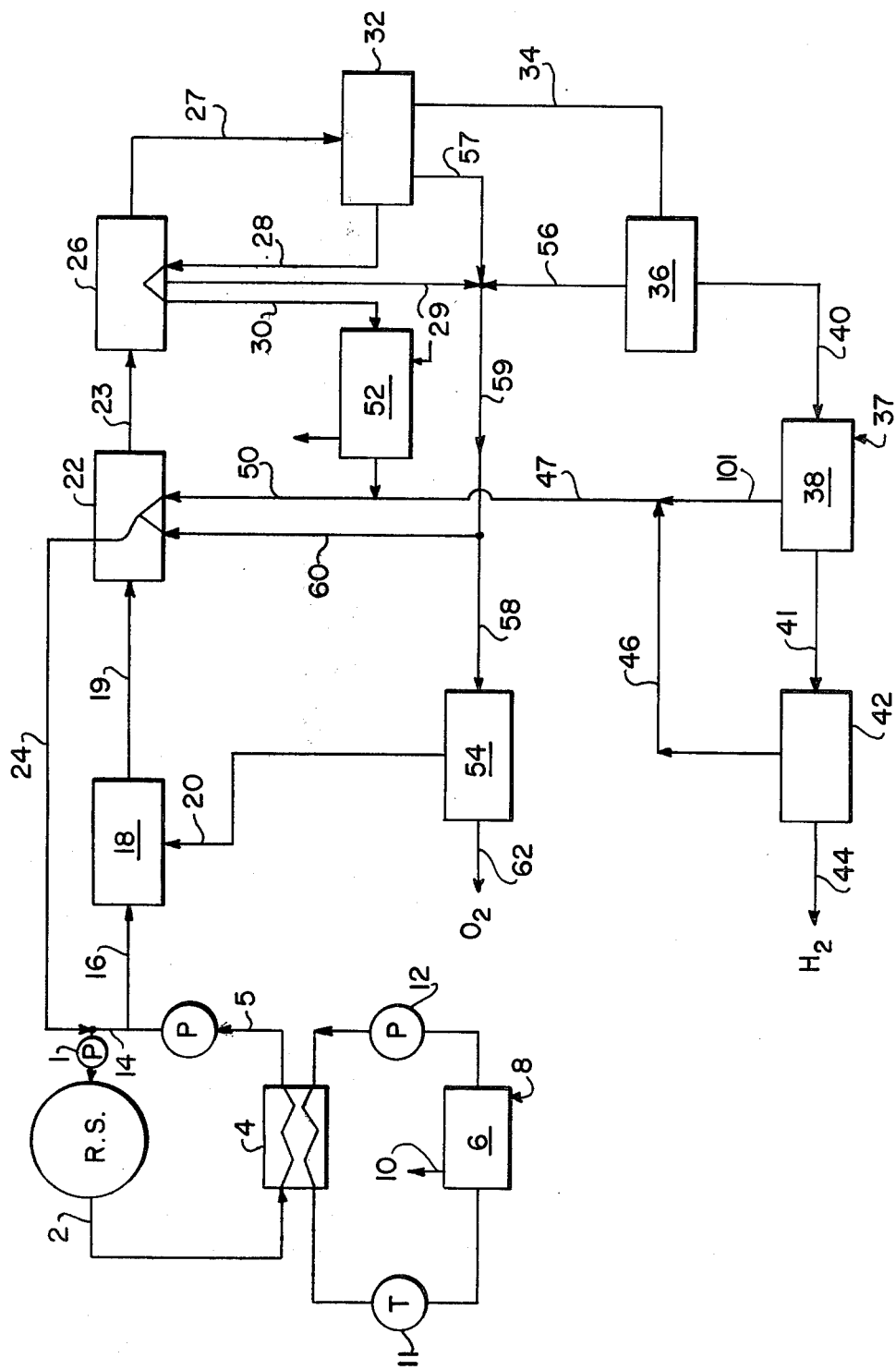

RADIOLYTIC-CHEMICAL METHOD FOR PRODUCTION OF GASES

This application is a continuation-in-part of Ser. No. 609,832 filed Sept. 2, 1975, now abandoned.

BACKGROUND

This invention relates to a new improved radiolytic-chemical method for gas production. More particularly, the present invention provides an efficient means for the improved production of gases useful for generation of fuels by inclusion in the radiolytic processing steps of predetermined amounts of oxide of nitrogen.

One problem in the prior art when deriving oxygen from compounds including combustible fuels is that of scavenging the surplus oxygen. This general subject matter is set forth for example in copending application Ser. No. 416,999 filed Nov. 19, 1973 by Robert J. Teitel.

Radiolysis, that is, the molecular fragmentation or dissociation of larger molecules by radiation is a known phenomenon. One example of radiolysis is the formation of carbon monoxide and oxygen by radiolytic decomposition of carbon dioxide. Typically, however, such production of carbon monoxide and oxygen is low an commercially inefficient because of the great tendency of carbon monoxide to re-combine with the oxygen.

A number of publications have considered use of oxides of nitrogen as means for inhibiting recombination of carbon monoxide and oxygen during decomposition of carbon dioxide by ionizing radiation. See for example, Chemonuclear Reactors and Chemical Processing, page 313, FIG. 19; P. Harteck et al., "Decomposition of Carbon Dioxide by Ionizing Radiation. Part II". *J. Chem. Phys.*, 26, no. 6, 1727-33 (1957); A. R. Anderson et al., "The Radiolysis of Carbon Dioxide", *Radiation Res. Rev.* 1, 269-300 (1968); and Steinberg "Radiation Processing Report No. 3", BNL 665 (T-219) (1961).

OBJECTIVES AND BRIEF DESCRIPTION

It has now been found, that by practice of the present invention there results a new improved method for radiolytic-chemical gas production. Oxides of nitrogen are used to prevent combination of the combustible fuels with oxygen during radiolysis. In addition they are useful in separating surplus oxygen from combustible fuel residual gases. The multi-step method is arranged such that, except for secondary losses such as by escape, evaporation, mutation and so forth, all chemicals, except for feed and product materials are completely recycled.

Generally, the present method is based on the following chemical reaction sequence:

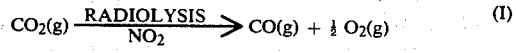  (I)

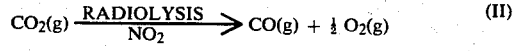  (II)

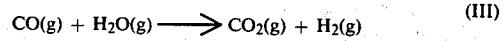  (III)

Thus, carbon dioxide is dissociated to carbon monoxide and oxygen while in the presence of nitrogen dioxide. The carbon monoxide may then be reacted with water to form carbon dioxide and hydrogen.

In the above reaction (III), the carbon dioxide can be recycled. The only feed material, namely water, is consumed through conversion to oxygen (I) and hydrogen (III). It will be appreciated that the heat needed for the thermochemical reactions can be derived directly from the fusion reaction or other high heat source as may be convenient. Reference is made to *Advances in Nuclear Science & Technology*, Vol. 1, P. 297, where a similar process has been reported in connection with fission energy sources.

The radiation source used for practice of the present invention may include those conventionally used to effect radiolysis. Dissociation may be effected by neutrons, alpha, X or gamma radiation. Use of radiation from thermonuclear fusion reactions has a significant advantage over the use of radiation from fission reactions because of the efficient production of neutrons and the absence of severe contamination of the products by radioactive fission fragments and by the fuel particles. In fission reactions, direct exposure of the molecules is necessary because about 80 per cent of the fission energy is contained in the fission fragments. In some cases, it is recognized however that fission energy such as gamma radiation or even some fast neutrons may prove useful without direct contact of the fission fragments with the materials being processed.

In thermonuclear fusion of D-T, 80 percent of the energy is released as fast neutrons and the remaining 20 percent of the energy is released as alpha and X rays. In the fusion reaction, the material to be processed may be exposed directly to the radiation or may be exposed while being confined in a separate container. The latter condition is particularly appropriate for the neutron exposure since the neutrons have an effective penetration characteristic.

Thus, the use of fusion devices, with the resulting high energy neutrons, as well as alpha and X rays, allows for the direct interaction of the radiation with the reactants while avoiding contamination with fission fragments. This difference alone is extremely significant in considering the use of thermonuclear reactors for chemonuclear processing by the present method.

Practice of the present invention will become more apparent from the following detailed description taken in connection with the accompanying drawing wherein like numerals refer to similar elements.

THE DRAWING

The FIGURE illustrates a block diagram of the processing system of the present invention.

DETAILED DESCRIPTION

Referring to the block diagram of the accompanying FIGURE, radiolysis may be effected by exposing carbon dioxide ($CO_2$) gas to a source of radiation (RS) while containing a stabilizing amount of an oxide of nitrogen. The amount of the oxide of nitrogen such as nitric oxide (NO), nitrogen dioxide ($NO_2$) or the like varies from about 0.1% by weight to about 5% by weight based upon the amount by weight of carbon dioxide. Typically, the amount of the gaseous oxide of nitrogen varies from about 0.5% to about 1.5% by weight with about 1% by weight being preferred.

Carbon dioxide and, for example, nitrogen dioxide may be introduced into the radiation source RS via line 1 and after radiation exposure exits the source by line 2 for passage to steam generator 4, steam from which may be used to generate power in turbine 11. Condenser 6 is cooled by water passing lines 8 and 10 while being cycled by pump 12.

In the illustrated method, the preferred embodiment of radiolytic conversion is effected by energy of a fusion reaction such as from deuterium-tritium (D-T) in pellet form. Although a number of different approaches are available, one that utilizes a source of energy from a laser and particular pellet configurations to achieve a fusion reaction in a reaction chamber is especially useful. Patents which illustrate generally the apparatus which can be used in this type of system include U.S. Pat. Nos. 3,378,446; 3,489,645; and 3,762,992. Also commercial neutron generators are currently available in the art, such as the Kaman generators, which may provide radiation energy.

Because of the relatively low conversion rate of $CO_2$ to CO and $O_2$ per pass, and the greater separation work required for a more dilute mixture of gases, a fraction of the gas, after heat removal in steam generator 4, is recycled via line 14. For example, about ¾ of the gas from the steam generator may be recycled via line 14 to inlet line 1. Pumps can be used at convenient locations such as shown.

Gases which are not recycled may be passed by line 16 to mixer 18. The oxygen in the gases is combined with nitric oxide (NO) via line 20 to form $NO_2$ which simplifies the separation of hydrogen, carbon dioxide, carbon monoxide or other forms of combustible gases and oxygen. For thermal efficiency, heat generated within mixer 18 may be recovered for other uses including supply of thermal energy where needed in the processing system.

The gas stream is next cooled in heat exchanger 22 which reheats $CO_2$ being recycled via line 24. Most of the $NO_2$ is removed in condenser 26 by counter-current flow of $CO_2$ liquid which evaporates via lines 28 and 30. Most of the $CO_2$ and remaining $NO_2$ is next separated in refrigeration unit 32. Liquid $CO_2$ passes via line 28 to $NO_2$ condenser 26. The cold gas stream passes into $NO_2$ absorber 36 via line 34. The $NO_2$ absorber 36 removes the remaining $NO_2$ from the cycling stream. Next, the gas mixture of $CO_2$ and CO enters an aqueous $K_2CO_3$ absorber unit 38 to effect removal of $CO_2$. The gas leaving absorber unit 38 via line 41 contains about 1% by weight $CO_2$ with the remainder being CO gas. The $CO_2$ removed is recovered and recycled to the heat exchanger 22 via lines 101 and 47. The gas mixture next proceeds to a water-gas shift reactor and $H_2$ separation unit 42 from which $H_2$ gas results via line 44. $CO_2$ from the $H_2$ separation unit is recycled in line 46. Also gases leaving water cooler 52 are permitted to return to line 50.

The recovered $NO_2$, except for a small recycle 60, is fed to $HNO_3$ subsystem 54 by means of lines 56 and 58. In unit 54, the $NO_2$ is permitted to react with azeotropic $HNO_3$ to form concentrated $HNO_3$ and regenerate NO for recycle in line 20. The concentrated $HNO_3$ is decomposed at elevated temperature and pressure to form $O_2$ which passes out by line 62.

A number of positive features are apparent in the $CO_2$ based cycle for producing hydrogen from water. For example, there is excess mechanical power capability. Also, the corrosion problems for most of the process are sufficiently mild that low alloy steel is a likely material of construction, except for unit 54.

A representative flow balance for the present system is presented in Table 1.

Although the present method has been illustrated generally by diagram, it will be apparent to those of the art that many variations may be made therein without departing from the essence of the features disclosed herein.

TABLE 1

| Process Stream # | Temp °F. | Pressure PSIA | Flow Rates, Lb. Mole/Hr. (G = 10) | | | | | | | |
|---|---|---|---|---|---|---|---|---|---|---|
| | | | $CO_2$ | CO | $NO_2$ | NO | $H_2O$ | $H_2$ | $O_2$ | Total |
| 1 | 600 | 600 | 38,217 | 2,609 | 430 | | | | 1,305 | 42,561 |
| 2 | 1,200 | 600 | 37,389 | 3,438 | 430 | | | | 1,719 | 42,976 |
| 5 | 600 | 600 | 37,389 | 3,438 | 430 | | | | 1,719 | 42,976 |
| 16 | 600 | 600 | 9,011 | 829 | 103.6 | | | | 414 | 10,357 |
| 14 | 600 | 600 | 28,378 | 2,609 | 326.4 | | | | 1,305 | 32,819 |
| 24 | 600 | 600 | 9,839 | | 103.6 | | | | | 9,943 |
| 20 | 100 | 600 | | | | 829 | | | | 829 |
| 19 | 610 | 600 | 9,011 | 829 | 808 | 124 | | | 62.1 | 10,834 |
| 60 | 12 | 600 | | | 103.6 | | | | | 103.6 |
| 50 | 148 | 600 | 9,839 | | | | | | | 9,839 |
| 23 | 175 | 600 | 9,011 | 829 | 932 | | | | | 10,771 |
| 30 | 43 | 600 | 7,548 | | | | | | | 7,548 |
| 29 | 53 | 600 | | | 654 | | | | | 654 |
| 27 | 53 | 600 | 9,011 | 829 | 278 | | | | | 10,118 |
| 28 | 12 | 600 | 7,548 | | | | | | | 7,548 |
| 57 | 12 | 600 | | | 254 | | | | | 254 |
| 59 | | 600 | | | 932 | | | | | 932 |
| 34 | 12 | 600 | 1,463 | 829 | 24 | | | | | 2,316 |
| 40 | 160 | 600 | 10.1 | 829 | | | 5.5 | | | 844.6 |
| 48 | 95 | 600 | 1,453 | | | | | | | 1,453 |
| 56 | 100 | 600 | | | 24 | | | | | 24 |
| 58 | 12 | 600 | | | 829 | | | | | 829 |
| 62 | 100 | 150 | | | | | | | 414 | 414 |
| 37 | 80 | 600 | | | | 829 | | | | 829 |
| 41 | 290 | 600 | 839 | | | | | 829 | | 1,668 |
| 44 | 100 | 600 | | | | | | 829 | | 829 |
| 46 | 90 | 600 | 839 | | | | | | | 839 |
| 47 | 95 | 600 | 2,292 | | | | | | | 2,292 |

What is claimed is:

1. A method of separating oxygen from a gaseous mixture including $CO_2$, oxygen and CO as a combustible gas reacting therewith, comprising the steps of,
   introducing NO into said gaseous mixture to react with oxygen and form $NO_2$, and
   removing the oxygen by separation of $NO_2$ from the gaseous mixture, converting $CO_2$ to CO and $O_2$ in said mixture before introduction of the NO by introducing radiation derived from a thermonuclear fusion reaction in the presence of the $CO_2$, and confining the $CO_2$ to be irradiated in a separate container to receive neutron radiation from the reaction by penetration into the separate container.

* * * * *